(12) United States Patent
Kim

(10) Patent No.: US 11,198,282 B2
(45) Date of Patent: Dec. 14, 2021

(54) METHOD FOR MANUFACTURING PACKAGING SHEET

(71) Applicants: SEGYERO CO., LTD., Gimje-si (KR); Ho Chil Kim, Iksan-si (KR)

(72) Inventor: Ho Chil Kim, Iksan-si (KR)

(73) Assignees: SEGYERO CO., LTD., Gimje-si (KR); Ho Chil Kim, Iksan-si (KR)

( * ) Notice: Subject to any disclaimer, the term of this patent is extended or adjusted under 35 U.S.C. 154(b) by 148 days.

(21) Appl. No.: 16/637,577

(22) PCT Filed: Aug. 17, 2018

(86) PCT No.: PCT/KR2018/009437
§ 371 (c)(1),
(2) Date: Feb. 7, 2020

(87) PCT Pub. No.: WO2019/035678
PCT Pub. Date: Feb. 21, 2019

(65) Prior Publication Data
US 2020/0254744 A1    Aug. 13, 2020

(30) Foreign Application Priority Data
Aug. 18, 2017   (KR) .................. 10-2017-0104539

(51) Int. Cl.
*B32B 37/10*     (2006.01)
*B32B 37/12*     (2006.01)
*B32B 27/08*     (2006.01)
*B32B 38/06*     (2006.01)
*B32B 37/00*     (2006.01)
*B65H 37/04*     (2006.01)

(52) U.S. Cl.
CPC .............. *B32B 37/10* (2013.01); *B32B 37/12* (2013.01); *B32B 27/08* (2013.01); *B32B 37/0053* (2013.01); *B32B 38/06* (2013.01); *B32B 2255/10* (2013.01); *B32B 2307/304* (2013.01); *B32B 2553/00* (2013.01); *B65H 37/04* (2013.01); *Y10T 156/1039* (2015.01)

(58) Field of Classification Search
None
See application file for complete search history.

(56) References Cited

U.S. PATENT DOCUMENTS 3,026,231 A * 3/1962 Chavannes ............. B44C 3/087
156/205

FOREIGN PATENT DOCUMENTS

| JP | 2004-009493 A | 1/2004 |
|---|---|---|
| JP | 2004-249605 A | 9/2004 |
| JP | 2012-179875 A | 9/2012 |

(Continued)

OTHER PUBLICATIONS

English machine translation of KR101752100 (B1); Jun. 30, 2017, Kim, 16 pages. (Year: 2017).*

*Primary Examiner* — Linda L Gray
(74) *Attorney, Agent, or Firm* — Novick, Kim & Lee, PLLC; Jae Youn Kim

(57) ABSTRACT

The present invention relates to a method of manufacturing a packaging sheet, the method being capable of not only greatly improve a heat insulation property of the packaging sheet, but also minimizing the volume of cells of the packaging sheet without opening the cells by partially cutting or needle-punching the cells, thereby facilitating storage and transportation of the packaging sheet.

7 Claims, 14 Drawing Sheets

(56) References Cited

FOREIGN PATENT DOCUMENTS

| KR | 10-1500879 | B1 | 3/2015 |
| KR | 10-1752100 | B1 | 6/2017 |
| KR | 10-1752101 | B1 | 6/2017 |
| KR | 10-2016-0117724 | | 8/2017 |

* cited by examiner

METHOD FOR MANUFACTURING PACKAGING SHEET

TECHNICAL FIELD

The present invention relates to a method of manufacturing a packaging sheet, the method being capable of not only greatly improving a heat insulation property of the packaging sheet, but also minimizing the volume of cells of the packaging sheet without opening the cells by partially cutting or needle-punching the cells, thereby facilitating storage and transportation of the packaging sheet.

BACKGROUND ART

In general, packaging materials are used not only to enhance the appearance of packed goods, but also to protect the packaged goods against external impacts. In particular, in packaging of electrical and electronic products or automobile parts such as, bumpers, fenders, doors, and the like, a first foaming paper sheet or an air cap wrapping sheet is generally used to separate the electrical and electronic parts and the automobile parts from an inner surface of a box wall inside of a paper box such that an impact force which may be externally applied to packed goods is absorbed and alleviated.

In the case of the air cap wrapping sheet, there is a problem in that the volume of air caps is inevitably large due to the air caps sealed in units of cells, causing an excessive increase in logistics costs such as transportation costs.

Meanwhile, in an effort to solve such a problem, the present applicant has proposed methods of manufacturing a packaging sheet having improved heat insulation and storage properties, which can greatly reduce logistics costs by minimizing volume during storage and transportation, as well as greatly improve a heat insulation property. These methods disclosed in Korean Patent No. 10-1752100 (hereinafter referred to as "Patent Document 1"), Korean Patent No. 10-1752101 (hereinafter referred to as "Patent Document 2"), and Korean Patent Application No. 10-2016-0117724 (hereinafter referred to as "Patent Document 3").

However, in the case of Patent Documents 3 and 2, there is a problem in that one side of a packaging sheet has to be cut in order to discharge fluid in the packaging sheet to the outside to minimize the volume of the packaging sheet, and this is a cumbersome work. In addition, Patent Document 3 also has a problem in that a part of a packaging sheet has to be cut or needle-punched in order to minimize the volume of the packaging sheet.

DISCLOSURE

Technical Problem

Accordingly, the present invention has been made keeping in mind the above problems occurring in the related art, and an objective of the present invention is to provide a method of manufacturing a packaging sheet, the method being capable of not only greatly improving a heat insulation property of the packaging sheet, but also minimizing the volume of cells of the packaging sheet without opening the cells by partially cutting or needle-punching the cells, thereby facilitating storage and transportation of the packaging sheet.

Technical Solution

In order to accomplish the above objective, the present invention provides a method of manufacturing a packaging sheet, the method including: a) manufacturing a formed film in which a plurality of cells are formed at a regular interval; b) bonding a lower-side film having one end that extends further than one end of the formed film to a lower side of the formed film such that the plurality of cells of the formed film are opened; c) filling a fluid into the plurality of the cells of the formed film; d) closing the plurality of cells of the formed film; and e) bonding an upper-side film onto the plurality of the cells.

Herein, the method may further include: f) leaking the fluid from an inside of the plurality of cells by releasing a closed state of the plurality of cells; and g) winding the formed film, the lower-side film, and the upper-side film on an outer surface of a winding roller in a roll type.

Furthermore, the formed film in the step a) may be manufactured in such a manner that a thermoplastic synthetic resin is melt-extruded to an embossing roller in which forming grooves having a shape corresponding to the cells are formed on an outer circumferential surface thereof at a regular interval, and in the step b), the lower-side film may be bonded to the formed film by a lower-side film compression roller for compressing the lower-side film unwound from a lower-side film roller onto the embossing roller.

Alternatively, the formed film in the step a) may be manufactured by an embossing roller in which forming grooves having a shape corresponding to the cells are formed on an outer circumferential surface thereof at a regular interval, and in the step b), the lower-side film may be bonded to the formed film by: an adhesive applying unit for applying an adhesive to the lower-side film unwound from a lower-side film roller at a predetermined interval; and a lower-side film compression roller for compressing the lower-side film unwound from the lower-side film roller onto the embossing roller.

Furthermore, in the step b), one sides or the other sides of the plurality of cells of the formed film may be opened or both the one sides and the other sides of the plurality of cells may be opened, and in the step c), the fluid may be temporarily filled in the plurality of cells by a fluid injector for injecting the fluid into the plurality of cells.

Furthermore, in the step d), the plurality of cells may be temporarily closed when the plurality of cells passes through a compression unit in a state in which the fluid is temporarily filled in the plurality of cells, the compression unit compressing one sides or the other sides of the plurality of cells or compressing both the one sides and the other sides of the plurality of cells.

Herein, the compression unit in the step d) may be configured as an apron conveyor which compresses the one sides or the other sides of the plurality of cells inwardly of the plurality of cells or compressing both the one sides and the other sides of the plurality of cells inwardly of the plurality of cells.

Furthermore, in the step e), the upper-side film may be bonded onto the plurality of cells by an upper-side film compression roller for compressing a melt-extruded thermoplastic synthetic resin for manufacturing the upper-side film onto the plurality of cells.

Alternatively, in the step e), the upper-side film may be bonded onto the plurality of cells by: an adhesive applying unit for applying an adhesive to the upper-side film unwound from an upper-side film roller at a predetermined interval; and an upper-side film compression roller for compressing the upper-side film unwound from the upper-side film roller onto the plurality of cells.

Advantageous Effects

The present invention can not only greatly improve a heat insulation property of a packaging sheet, but also minimize the volume of cells of the packaging sheet without opening the cells by partially cutting or needle-punching the cells, thereby facilitating storage and transportation of the packaging sheet.

BEST MODE

Hereinafter, exemplary embodiments of the present invention will be described in detail with reference to the accompanying drawings. Of course, the scope of the present invention is not limited to the following embodiments, and various modifications can be made by those skilled in the art without departing from the technical gist of the present invention.

Figure 1:
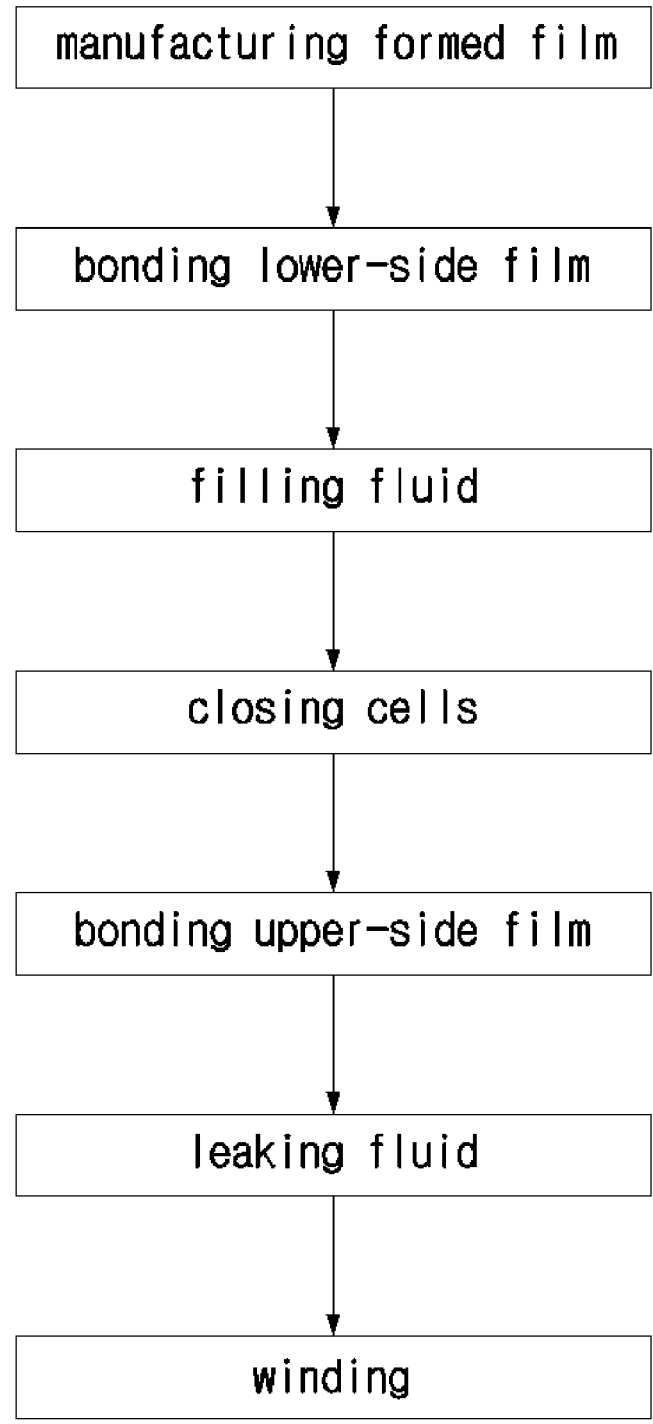
FIG. 1 is a block diagram schematically illustrating a process of a method of manufacturing a packaging sheet according to a first embodiment of the present invention.

FIG. 1 is a block diagram schematically illustrating a process of a method of manufacturing a packaging sheet according to a first embodiment of the present invention.

As illustrated in FIG. 1, the method of manufacturing the packaging sheet according to the first embodiment of the present invention largely includes: a) formed film manufacturing step (hereinafter referred to as "step a)"): b) lower-side film bonding step (hereinafter referred to as "step b)"); c) fluid filling step (hereinafter referred to as "step c)"); d) cell closing step (hereinafter referred to as "step d)"); and e) upper-side film bonding step (hereinafter referred to as "step e)").

Figure 2:
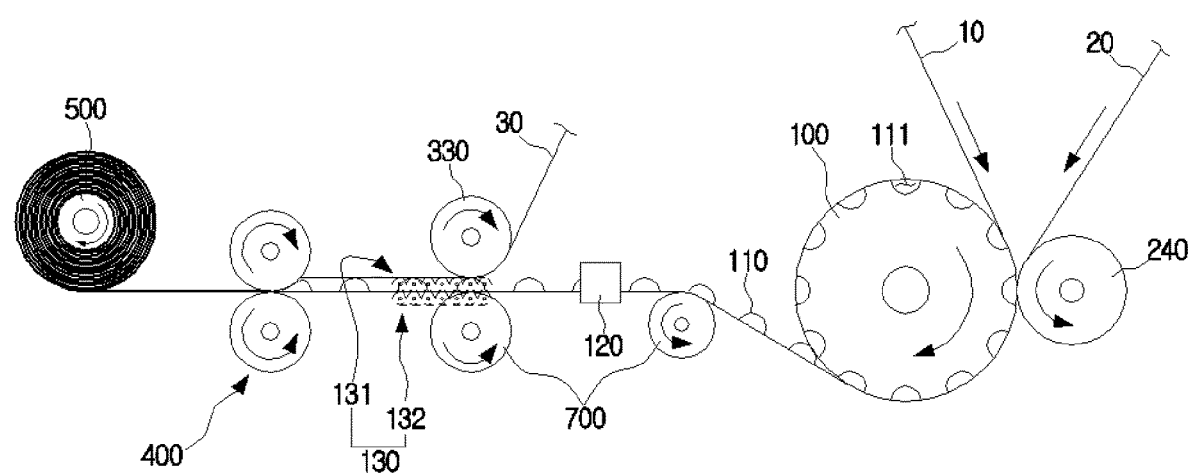
FIG. 2 is a side view schematically illustrating a process of the method of manufacturing the packaging sheet according to the first embodiment of the present invention.
Figure 3:
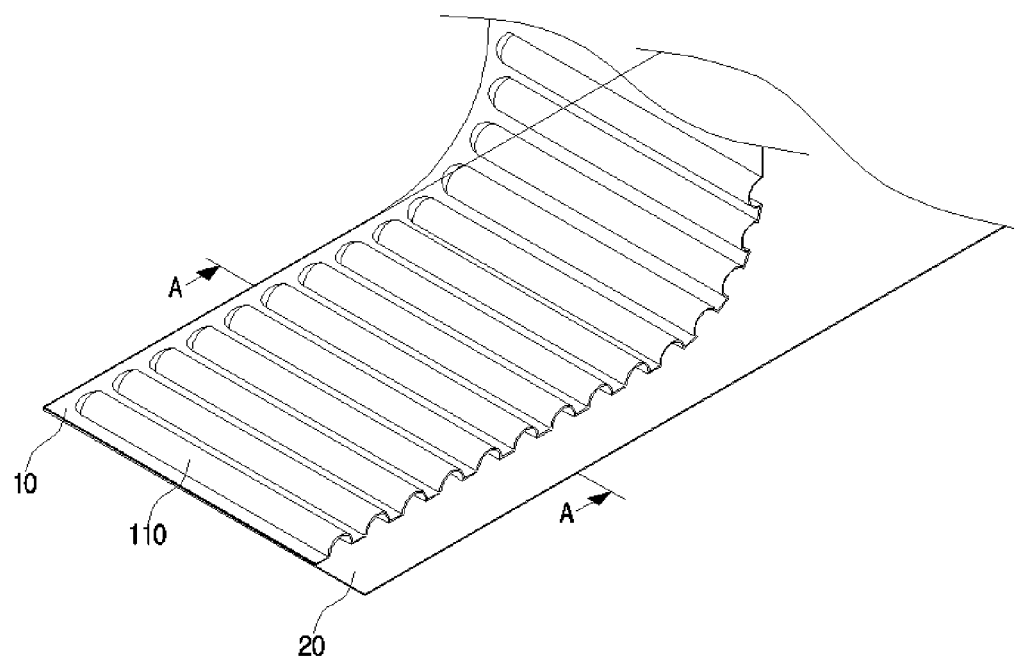
FIG. 3 is a perspective view schematically illustrating one example in which a formed film and a lower-side film are bonded to each other by an embossing roller and a lower-side film roller in the first embodiment.
Figure 4:
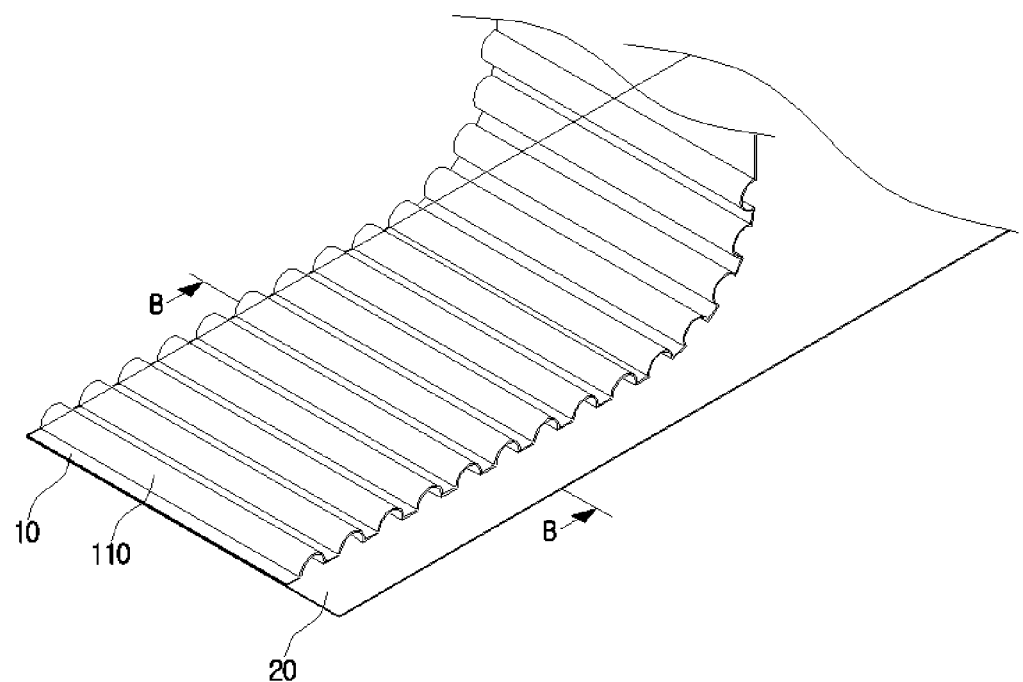
FIG. 4 is a perspective view schematically showing another example in which the formed film and the lower-side film are bonded to each other by the embossing roller and the lower-side film roller in the first embodiment.

FIG. 2 is a side view schematically illustrating a process of the method of manufacturing the packaging sheet according to the first embodiment of the present invention, FIG. 3 is a perspective view schematically illustrating one example in which a formed film and a lower-side film are bonded to each other by an embossing roller and a lower-side film roller in the first embodiment, and FIG. 4 is a perspective view schematically showing another example in which the formed film and the lower-side film are bonded to each other by the embossing roller and the lower-side film roller in the first embodiment.

First, as illustrated in FIGS. 3 and 4, the step a) is a step of manufacturing a formed film in which a plurality of cells 110 are formed at a regular interval.

The plurality of cells 110 convex upwardly of the formed film 10 may be formed at a regular interval in a direction from a front side to a rear side of the formed film 10.

In one example, as illustrated in FIG. 2, the formed film 10 may be manufactured in such a manner that a thermoplastic synthetic resin melt-extruded from a T-die (not illustrated) is supplied to an embossing roller 100 in which forming grooves 111 having a shape corresponding to the cells 110 are formed on an outer circumferential surface thereof at a regular interval.

Next, as illustrated in FIGS. 3 and 4, the step b) is a step of fusion bonding the lower-side film 20 to a lower side of the formed film 10 such that the plurality of cells 110 of the formed film 10 are opened.

In order to more easily provide a check valve 40 which will be described later at one side of the lower-side film 20, one end of the lower-side film 20 is formed to extend outwardly from one side of the formed film 10 further than one end of the formed film 10 such that the left-right length from one side to the other side of the lower-side film 20 is longer than the left-right length from one side to the other side of the formed film 10.

In one example, as illustrated in FIG. 3, in the step b), the lower-side film 20 may bonded to the lower side of the formed film 10 by fusing such that the other sides of the plurality of cells 110 of the formed film 10 are closed while one sides of the plurality of cells 110 are opened.

In another example, as illustrated in FIG. 4, the lower-side film 20 may be bonded to the lower side of the formed film 10 by fusing such that all the one sides and the other sides of the plurality of cells 110 of the formed film 10 are closed.

In addition, as illustrated in FIG. 2, in the step b), the lower-side film 20 may be bonded to the lower side of the formed film 10 by fusing by a lower-side film roller (not illustrated) and a lower-side film compression roller 240.

The lower-side film 20 may be wound on an outer surface of the lower-side film roller (not illustrated) in a roll type.

The lower-side film compression roller 240 compresses the lower-side film 20 unwound from the lower-side film roller (not illustrated) to the formed film 10 100 on the outer surface of the embossing roller 100, which is unwound from the embossing roller 100.

Next, the step c) is a step of filling a fluid into the plurality of cells 110 of the formed film 10.

Figure 5A:
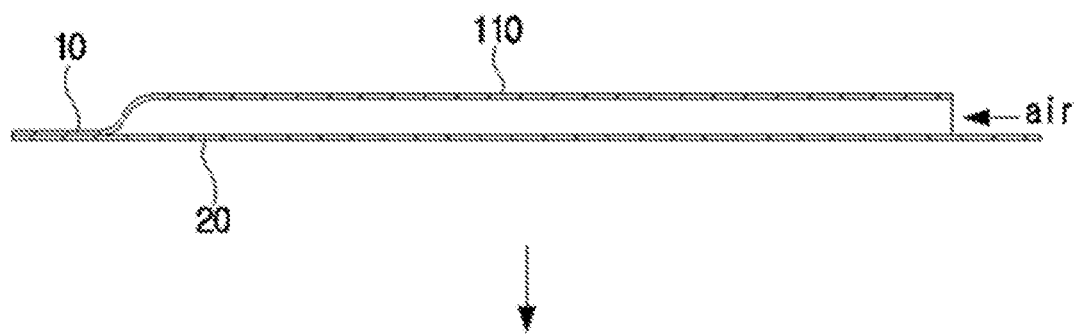
FIG. 5A and FIG. 5B are sectional views taken along line A-A of FIG. 3 schematically illustrating one example of a process in which a plurality of cells are closed with a fluid filled in the plurality of cells.
Figure 5B:
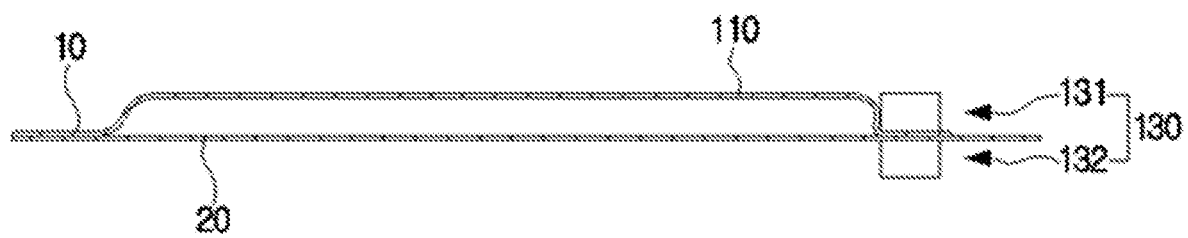

FIG. 5A and FIG. 5B are sectional views taken along line A-A of FIG. 3 schematically illustrating one example of a process in which a plurality of cells are closed with fluid filled in the plurality of cells.

In one example, as illustrated in FIG. 5A and FIG. 5B, the fluid may be temporarily filled into the plurality of cells 110 by a fluid injector 120 injecting the fluid into the plurality of cells 110 in a state in which the formed film 10 and the lower-side film 20 bonded to each other pass between the embossing roller 100 and the lower-side film compression roller 240 as illustrated in FIG. 2.

The fluid filled in the plurality of cells 110 may be configured as various types, for example, may be configured as a gas such as air or an inert gas. The fluid injector 120 may be configured as various types such as a compressor for temporarily filling air into the plurality of cells 110 or an inert gas injector for temporarily injecting an inert gas into the plurality of cells 110.

The gas may be configured as various types such as air or an inert gas such as nitrogen, argon, krypton, helium, neon, xenon, or radon which are stable gases that have low reactivity as well as having an excellent heat insulation property.

Next, the step d) is a step of temporarily closing the plurality of cells 110 filled with the fluid.

As illustrated in FIG. 2 and FIG. 5A and FIG. 5B, the plurality of cells 110 may be temporarily closed through a compression unit 130 in a state in which the formed film 10 and the lower-side film 20 pass through the fluid injector 120.

In one example, as illustrated in FIG. 5A and FIG. 5B, one side of the formed film 10 and one side of the lower-side film 20 may pass through the compression unit 130 located at one side of the formed film 10 and one side of the lower-side film 20 in a state in which the fluid is temporarily filled in the plurality of cells 110 having the one sides opened, through the fluid injector 120.

As illustrated in FIGS. 2 and 5, the compression unit 130 may be configured as an apron conveyor which may largely include: an upper apron conveyor 131; and a lower apron conveyor 132 provided below the upper apron conveyor 131 in contact with a lower portion of the upper apron conveyor 131.

The one sides of the plurality of cells 110 may be compressed inwardly of the plurality of cells 110 while one side of the formed film 10 and one side of the lower-side film 20 passing through the fluid injector 120 pass between the upper apron conveyor 131 and the lower apron conveyor 132

Figure 6A:
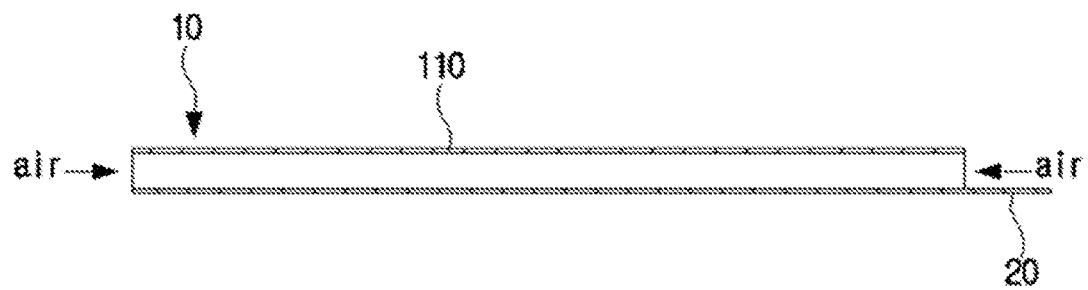
FIG. 6A and FIG. 6B are sectional views taken along line B-B of FIG. 4 schematically illustrating a process of another example in which the plurality of cells are closed with the fluid filled in the plurality of cells.
Figure 6B:
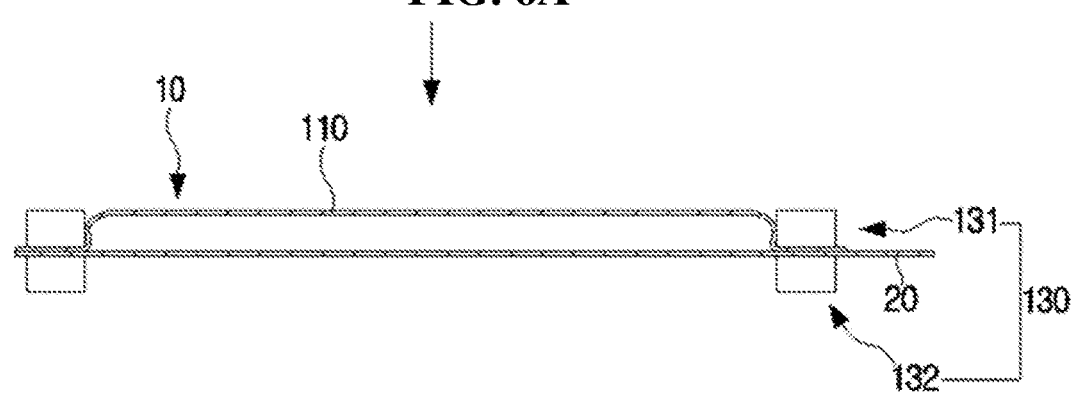

FIG. 6A and FIG. 6B are sectional views taken along line B-B of FIG. 4 schematically illustrating a process of another example in which the plurality of cells are closed with the fluid filled in the plurality of cells.

In another example, as illustrated in FIG. 6A and FIG. 6B, one side and the other side of the formed film 10 and one side and the other side of the lower-side film 20 may pass through compression units 130 each of which is located at one side of the formed film 10 and one side of the lower-side film 20 and at the other side of the formed film and the other side of the lower-side film in a state in which the fluid is temporarily filled in the plurality of cells 110 having the one sides and the other sides opened, through the fluid injector 120.

Figure 7:
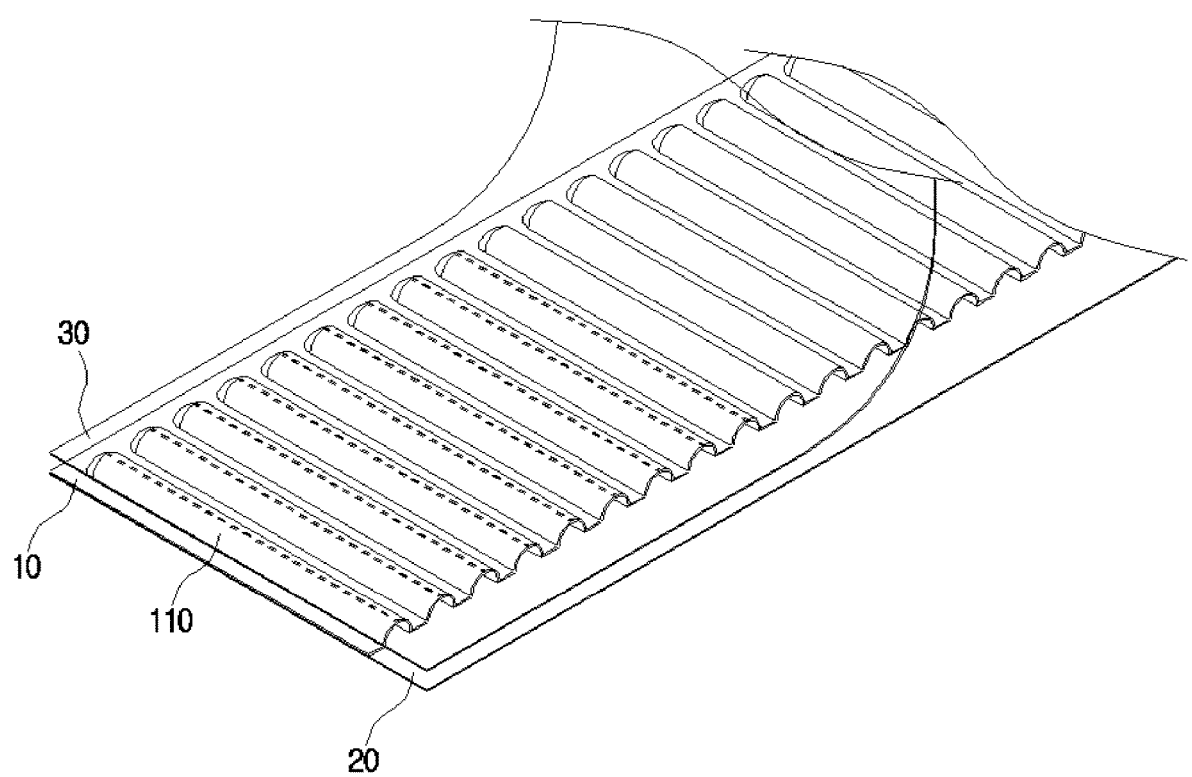
FIG. 7 is a perspective view schematically illustrating a state in which an upper-side film is bonded onto the plurality of cells of the formed film in the first embodiment.

FIG. 7 is a perspective view schematically illustrating a state in which the upper-side film is bonded onto the plurality of cells of the formed film in the first embodiment.

Next, as illustrated in FIG. 7, the step e) is a step of fusion bonding the upper-side film 30 to upper portions of the plurality of cells 110.

When the plurality of cells 110 are temporarily closed by the compression unit 130, the fluid can be temporarily prevented from leaking outwardly of the plurality of cells 110 and thus a convexly expanded state of the plurality of the cells 110 can be maintained. This makes it possible to more easily fusion bonding the upper-side film 30 to the upper portions of the plurality of cells 110.

As illustrated in FIG. 2, the upper-side film 30 in the step e) may be bonded to the upper portions of the plurality of cells 110 by fusing in a state of being compressed by an upper-side film compression roller 330 for compressing a thermoplastic synthetic resin onto the upper portions of the plurality of cells 110, the thermoplastic synthetic resin being melt-extruded from another T-die (not illustrated) to manufacture the upper-side film 30.

As illustrated in FIG. 2, a guide roller 700 on which the upper-side film 20 bonded to the formed film 10 is seated may be provided at each of positions between the fluid injector 120 and the embossing roller 100 and below the upper-side film compression roller 330.

Next, as illustrated in FIG. 1, the present invention may further include: f) fluid leaking step (hereinafter referred to as "step f"); and g) winding step (hereinafter referred to as "step g)").

Figure 8:
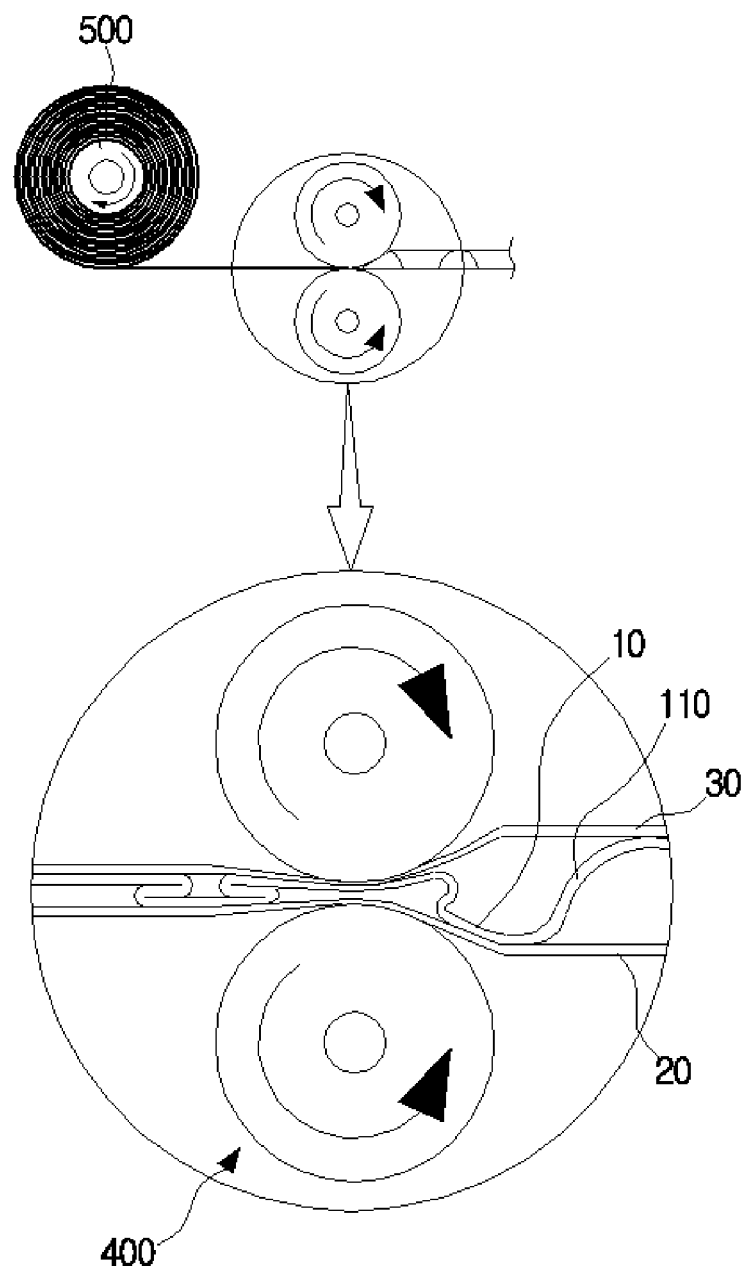
FIG. 8 is a partially enlarged side view illustrating a process in which the formed film, the lower-side film, and the upper-side film are wound on a winding roller in a compressed state.

FIG. 8 is a partially enlarged side view illustrating a process in which the formed film, the lower-side film, and the upper-side film are wound on a winding roller in a compressed state.

The step f) is a step of leaking the fluid from an inside of the plurality of cells 110.

After the formed film 10, the lower-side film 20, and the upper-side film 30 pass through the compression unit 130, a closed state of the plurality of cells 110 may be released and thus the fluid may leak from the inside of the cells 110 to an outside of the cells.

In order to more easily leak the fluid inside the plurality of cells 110 to the outside of the cells 110, as illustrated in FIG. 8, the formed film 10, the lower-side film 20, and the upper-side film 30 may be passed between a pair of rotary rollers 400 so that the formed film 10, the lower-side film 20, and the upper-side film 30 may be compressed while the fluid inside the plurality of cells 110 may leak to the outside of the cells 110.

As illustrated in FIG. 8, the step g) is a step of winding the formed film 10, the lower-side film 20, and the upper-side film 30 that are compressed while passing between the pair of rotary rollers 400 on an outer surface of the winding roller 500 in a roll type.

Through the step g), it is possible to store and transport the packaging sheet with the volume minimized because the fluid inside the cells 110 is removed, thereby significantly reducing logistics costs.

Figure 9:
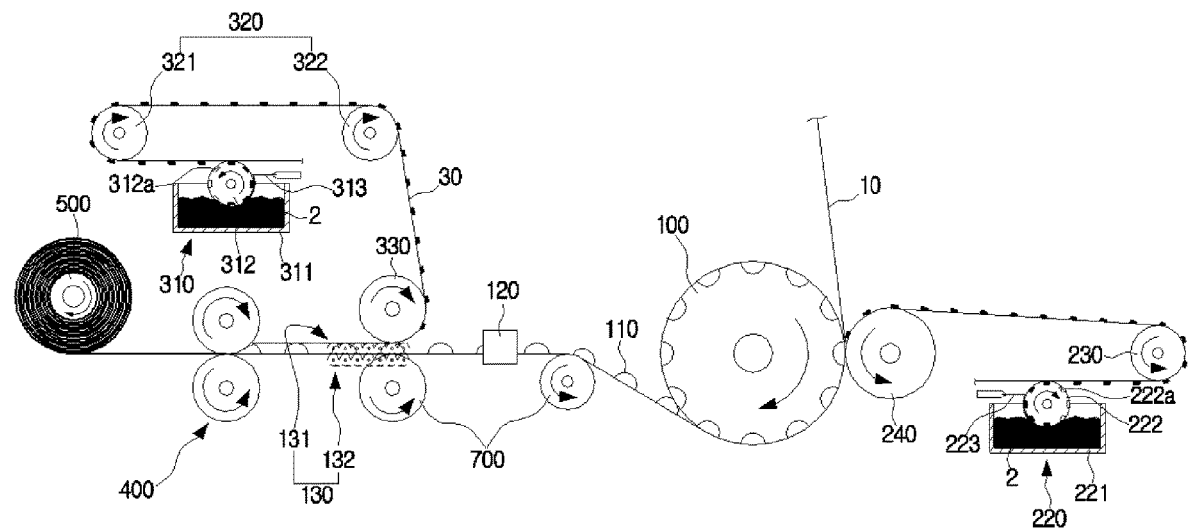
FIG. 9 is a side view schematically illustrating a process of a method of manufacturing a packaging sheet according to a second embodiment of the present invention.

FIG. 9 is a side view schematically illustrating a process of a method of manufacturing a packaging sheet according to a second embodiment of the present invention.

Next, as illustrated in FIG. 9, the method of manufacturing the packaging sheet according to the second embodiment of the present invention may be performed in the same manner as in the first embodiment, except for the fact that in step a), a formed film 10 may be manufactured in such a manner that the formed film wound on an outer circumferential surface of a formed film roller (not illustrated) is unwound to an embossing roller 100 and a plurality of the cells 110 are formed on the formed film at a regular interval by the embossing roller 100.

In addition, in step b), a lower-side film 20 may be adhesive bonded to a lower side of the formed film 10 by a lower-side film roller (not illustrated), an adhesive applying unit 220, a lower-side film guide roller 230, and a lower-side film compression roller 240.

The adhesive applying unit 220 may include an adhesive container 221, an adhesive transfer roller 222, and a blade 223.

An adhesive 2 to be applied to the lower-side film 20 may be accommodated at a predetermined height inside the adhesive container 511.

The adhesive transfer roller 512 may be shafted to an inner upper side of the adhesive container 511 in a state in which a lower portion of the adhesive transfer roller 512 is immersed in the adhesive 2 accommodated in the adhesive container 511.

An upper portion of the adhesive transfer roller 222 may come into contact with the lower-side film 20 wound on the lower-side film roller (not illustrated).

The adhesive transfer roller 222 may include a plurality of receiving grooves 222a formed in an outer surface thereof at a predetermined interval in a matrix form and in which a part of the adhesive 2 accommodated in the adhesive container 221 is accommodated.

Figure 10:
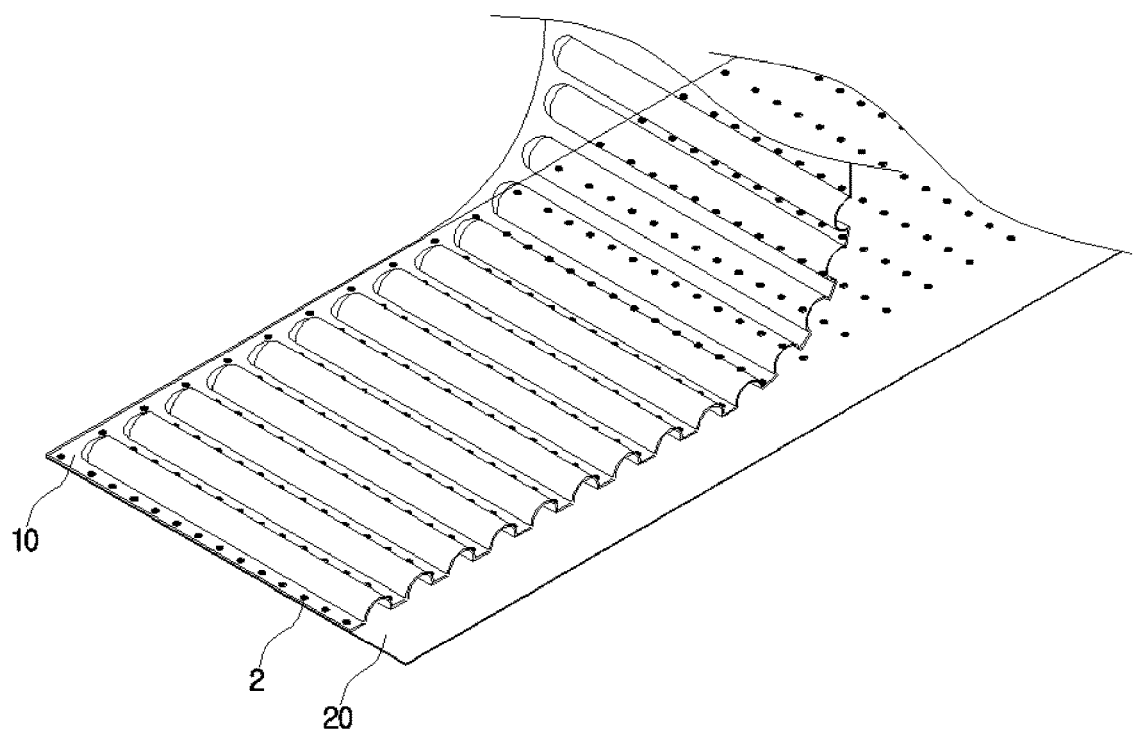
FIG. 10 is a perspective view schematically illustrating one example in which a formed film and a lower-side film are bonded to each other by an embossing roller and a lower-side film roller in the second embodiment.
Figure 11:
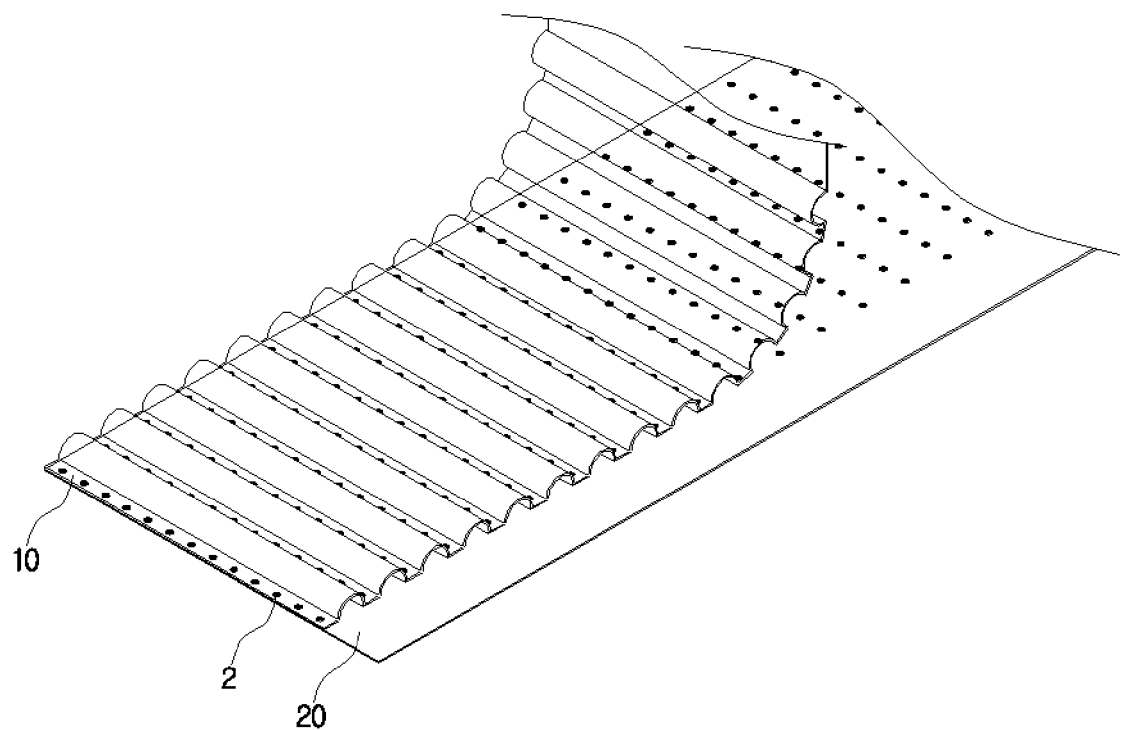
FIG. 11 is a perspective view schematically illustrating another example in which the formed film and the lower-side film are bonded to each other by the embossing roller and the lower-side film roller in the second embodiment.

FIG. 10 is a perspective view schematically illustrating one example in which the formed film and the lower-side film are bonded to each other by the embossing roller and the lower-side film roller in the second embodiment, and FIG. 11 is a perspective view schematically illustrating another example in which the formed film and the lower-side film are bonded to each other by the embossing roller and the lower-side film roller in the second embodiment.

As illustrated in FIGS. 10 to 11, through a part of the adhesive accommodated in the plurality of receiving grooves 222a formed in the outer surface of the adhesive transfer roller 222 in a matrix form at a regular interval, the adhesive 2 may be applied onto an upper surface of the lower-side film 20 unwound from the lower-side film roller (not illustrated) at a regular interval in a matrix form.

The blade 223 may be in contact with the outer surface of the adhesive transfer roller 222 to remove the adhesive 2 that remains on the outer surface of the adhesive transfer roller 222.

The lower-side film guide roller 230 may guide the lower-side film 20 to the embossing roller 100 in a state in which the lower-side film 20 unwound from the lower-side film roller (not illustrated) slides over a rear side of the lower-side film guide roller 230.

In addition, as illustrated in FIG. 9, the upper-side film 30 in step e) of the second embodiment may be adhesive bonded to upper portions of the plurality of cells 110 by an upper-side film roller (not illustrated), an adhesive applying unit 310, an upper-side film guide roller 320, and an upper-side film compression roller 330.

The upper-side film 30 may be wound on an outer surface of the upper-side film roller (not illustrated) in a roll type.

The adhesive applying unit 310 may include an adhesive container 311, an adhesive transfer roller 312, and a blade 313.

An adhesive 2 to be applied to the upper-side film 30 may be accommodated at a predetermined height inside the adhesive container 311.

The adhesive transfer roller 312 may be shafted to an inner upper side of the adhesive container 311 in a state in which a lower portion of the adhesive transfer roller 312 is immersed in the adhesive 2 accommodated in the adhesive container 311.

An upper portion of the adhesive transfer roller 312 may come into contact with the upper-side film 30 wound on the upper-side film roller (not illustrated).

The adhesive transfer roller 312 may include a plurality of receiving grooves 312a formed in an outer surface thereof at a predetermined interval in a matrix form and in which a part of the adhesive 2 accommodated in the adhesive container 311 is accommodated.

Figure 12:
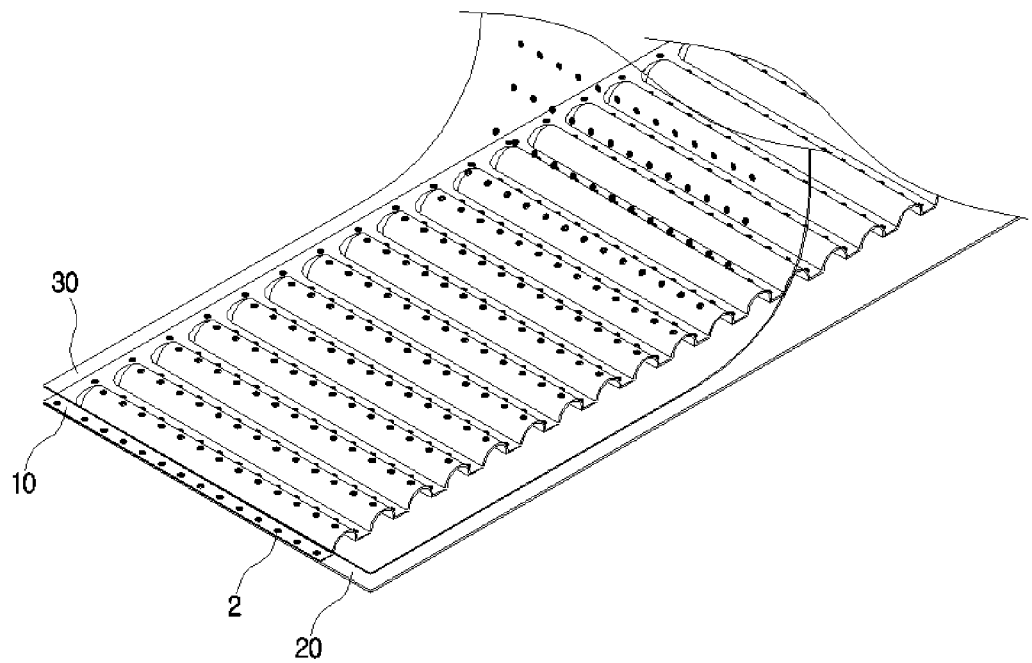
FIG. 12 is a perspective view schematically illustrating a state in which an upper-side film is bonded onto a plurality of cells of the formed film in the second embodiment.
Figure 13:
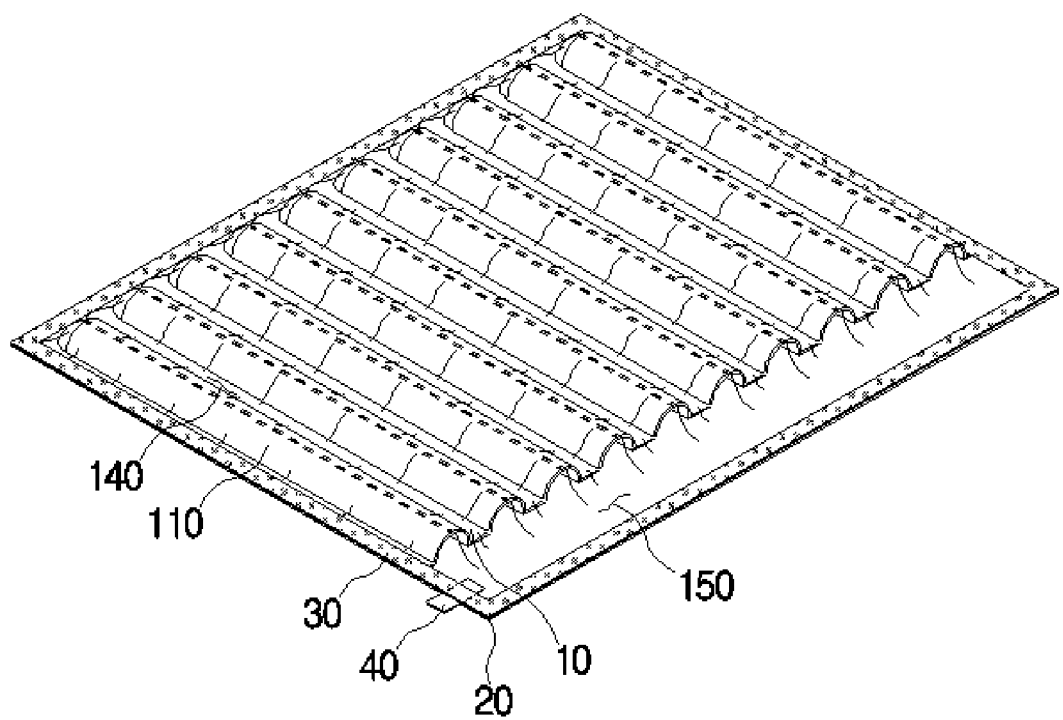
FIGS. 13 to 17 are perspective views schematically illustrating a state in which the formed film, the lower-side film, and the upper-side film are bonded to each other with a check valve provided.

FIG. 12 is a perspective view schematically illustrating a state in which the upper-side film is bonded onto the plurality of cells of the formed film in the second embodiment.

As illustrated in FIG. 12, through a part of the adhesive 2 accommodated in the plurality of receiving grooves 312a formed in the outer surface of the adhesive transfer roller 312 in a matrix form at a regular interval, the adhesive 2 may be applied onto a lower surface of the upper-side film 30 unwound from the upper-side film roller (not illustrated) at a regular interval in a matrix form.

The blade 313 may be in contact with the outer surface of the adhesive transfer roller 312 to remove the adhesive 2 that remains on the outer surface of the adhesive transfer roller 312.

The upper-side film guide roller 320 may include a first upper-side film guide roller 321 and a second upper-side film guide roller 322.

The upper-side film 30 unwound from the upper-side film roller (not illustrated) may slide over a front side of the first upper-side film guide roller 321.

The second upper-side film guide roller 322 may be located at a rear side opposite to the front side of the first upper-side film guide roller 321, and the upper-side film 30 may be guided to the upper-side film compression roller 330 in a state in which the upper-side film 30 slides over an upper portion of the second upper-side film guide roller 322.

FIGS. 13 to 17 are perspective views schematically illustrating a state in which the formed film, the lower-side film, and the upper-side film are bonded to each other with a check valve provided.

Next, as illustrated in FIGS. 13 to 17, an edge of the lower-side film 20 and an edge of the upper-side film 30 may be bonded to each other by fusing or adhesion in a state in which one or two or more check valves 40 are provided at a predetermined interval between one side of the lower-side film 20 and one side of the upper-side film 30.

An injection space 150 being in communication with the plurality of cells 110 may be formed between one side of the lower-side film 20 and one side of the upper-side film 30.

The check valve 40 may be provided in a state of being bonded to one side of an upper portion or the other side of the upper portion of the lower-side film 20 by fusing or adhesion before the packaging sheet according to the present invention is manufactured.

Alternatively, the check valve 40 may be provided in a state of being bonded to one side of a lower portion or the other side of the lower portion of the upper-side film 30 by fusing or adhesion before packaging sheet according to the present invention is manufactured.

Alternatively, one or two or more check valves 40 may be bonded at a regular interval between one side of the lower-side film 20 and one side of the upper-side film 30, the lower-side film and the upper-side film being unwound from the winding roller 500, by fusing or adhesion before the packaging sheet is used after manufacturing of the packaging sheet according to the present invention.

Alternatively, the check valve 40 may be bonded to one side of the lower-side film 20 or one side of the upper-side film 30 by fusing or adhesion before the upper-side film 30 is bonded to the upper portions of the plurality of cells 110 during the process of manufacturing the packaging sheet according to the present invention.

Alternatively, the check valve 40 may be bonded to one side of the lower-side film 20 or one side of the upper-side film 30 by fusing or adhesion before the formed film 10, the lower-side film 20, and the upper-side film 30 are wound on the winding roller 500 after the upper-side film 30 is bonded to the upper portions of the plurality of cells 110 during the process of manufacturing the packaging sheet according to the present invention.

An operator may use an injection means such as an injector to inject a fluid into both the cells 110 and spaces 140 formed between the cells 110 through the check valve 40 and the injection space 150.

Herein, since the fluid is injected into the spaces 140 formed between the cells 110, it is possible to block heat exchange due to the spaces 140, thereby preventing a heat insulation property of the packaging sheet according to the present invention from decreasing.

Figure 14:
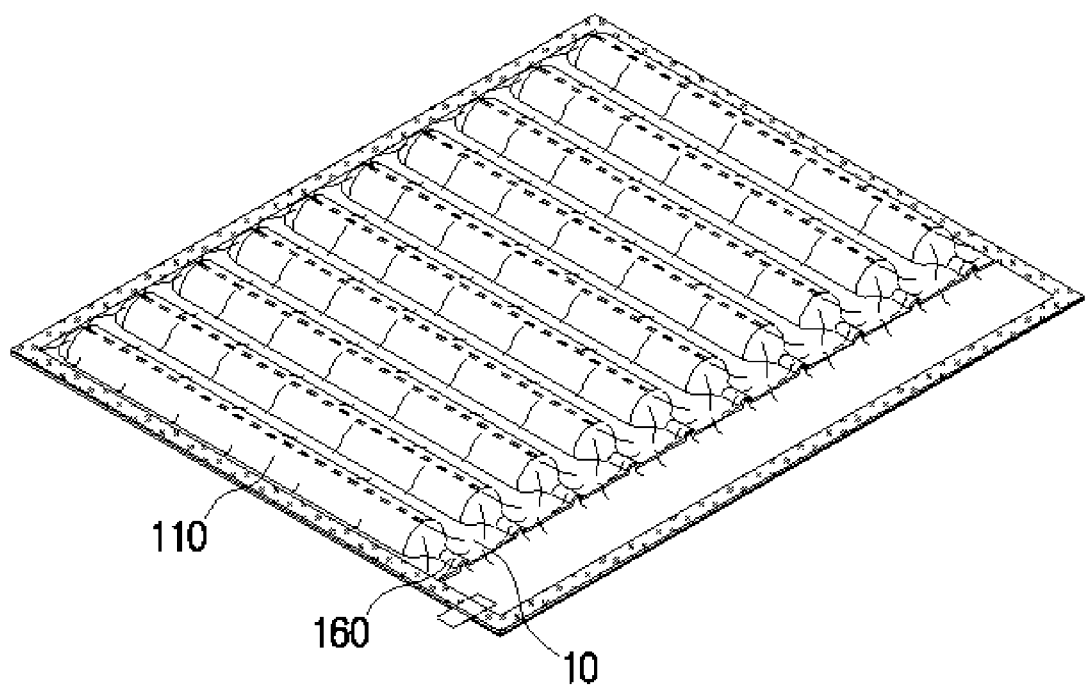

As illustrated in FIG. 14, a connection cell 160 may be formed at one side of the formed film 10 to be in communication with each of the plurality of cells 110 and the injection space 150.

The connection cell 160 may have a smaller inner diameter than each of the cells 110.

Figure 15:
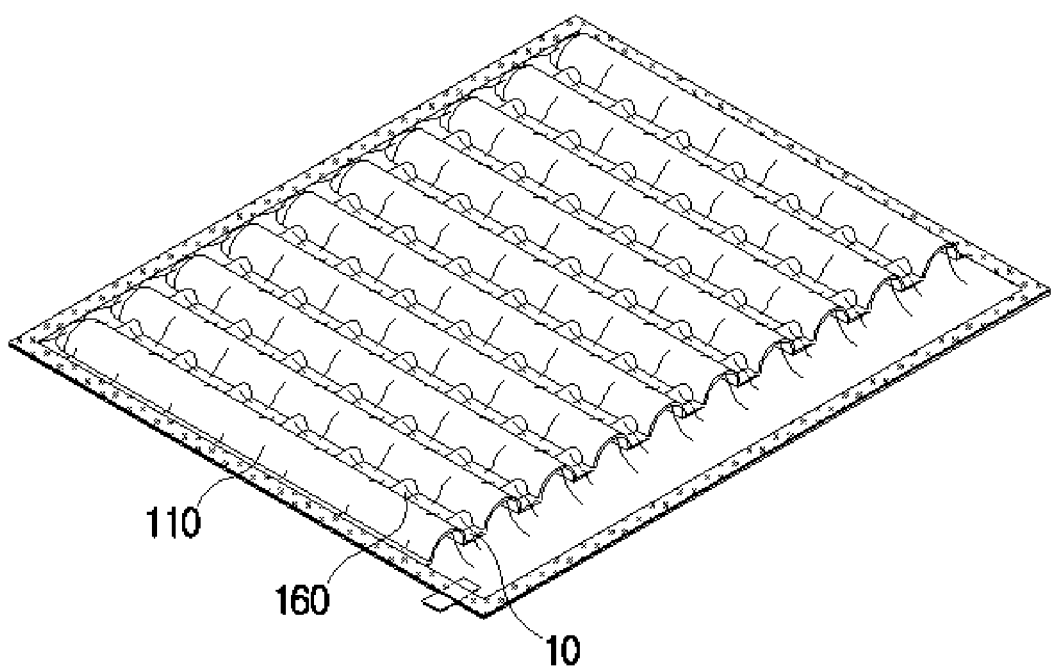

Alternatively, as illustrated in FIG. 15, a plurality of connection cells 160 for connecting one cell 110 and the other cell 110 in communication with each other may be formed at a regular interval between one cell 110 and the other cell 110.

Figure 16:
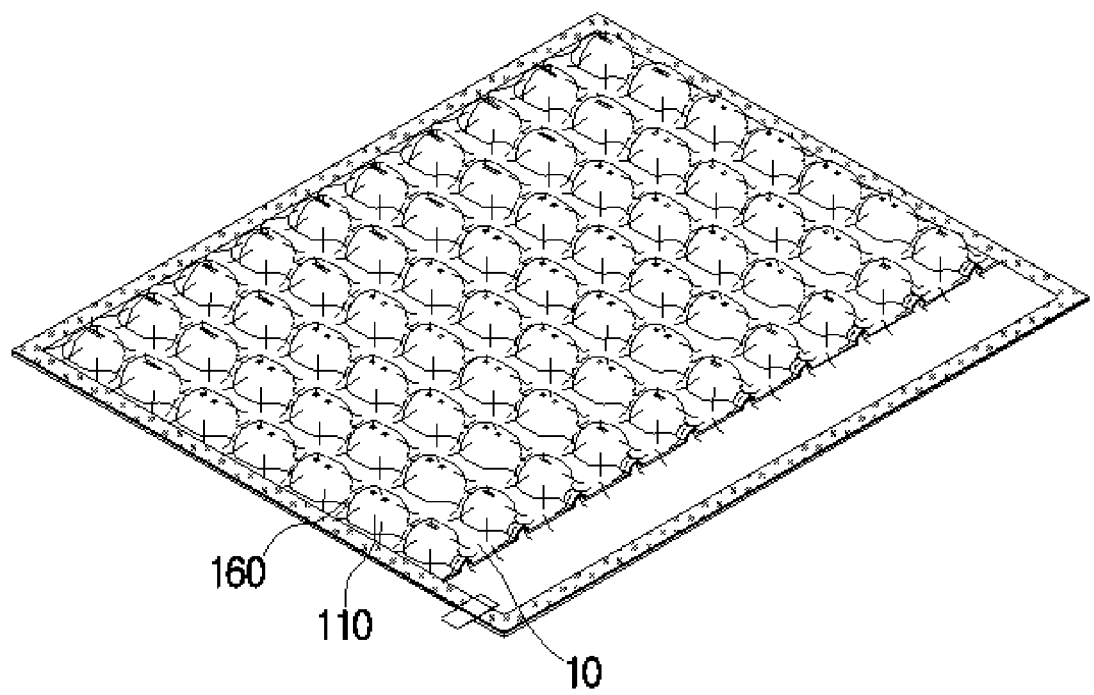

Alternatively, as illustrated in FIG. 16, a plurality of cells 110 which may be formed in various shapes such as circular or elliptical may be formed on the formed film 10 in a matrix form.

In addition, a connection cell 160 for connecting one cell 110 and the other cell 110 in communication with each other may be provided such that connection cells are arranged between the plurality of cells 110 formed in a matrix form at a regular interval in a direction from one side to the other side of the formed film.

Figure 17:
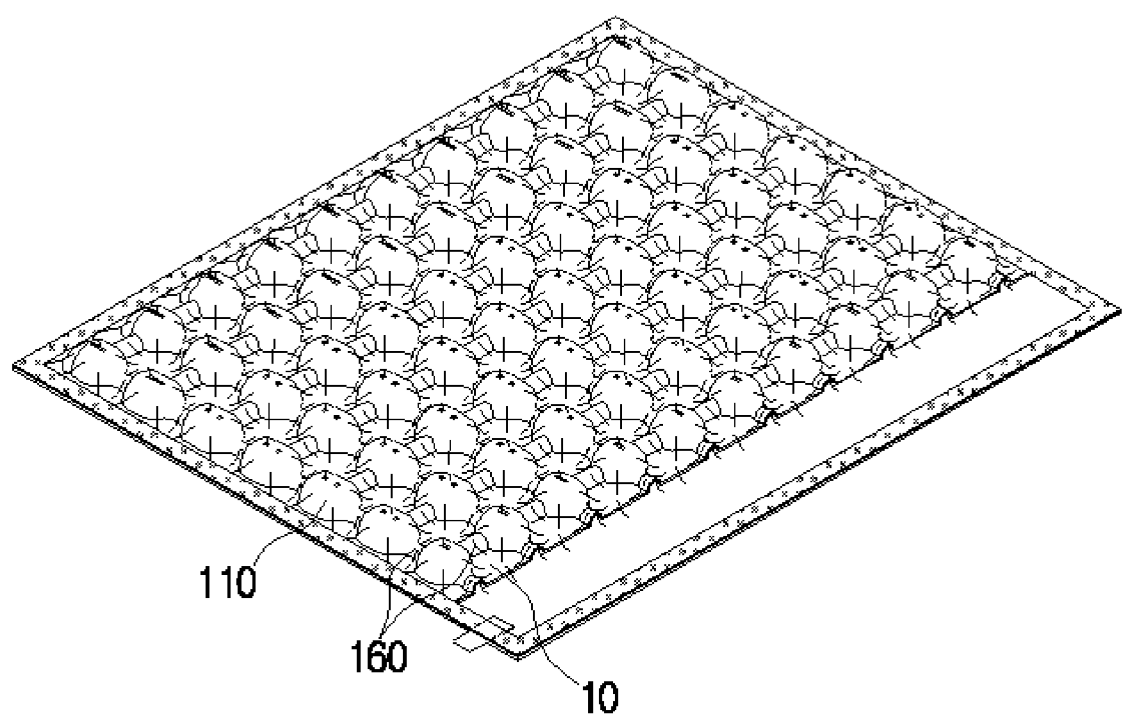

In addition, as illustrated in FIG. 17, the connection cell 160 may be formed between each of the cells 110 in one row and each of the cells 110 in the other row.

INDUSTRIAL APPLICABILITY

The present invention can not only greatly improve a heat insulation property of a packaging sheet, but also minimize the volume of cells of the packaging sheet without opening the cells by partially cutting or needle-punching the cells, thereby facilitating storage and transportation of the packaging sheet.

The invention claimed is:

1. A method of manufacturing a packaging sheet, the method comprising:
    a) manufacturing a formed film in which a plurality of cells are formed at a regular interval;
    b) bonding a lower-side film having one end that extends further than one end of the formed film to a lower side of the formed film such that the plurality of cells of the formed film are open;
    c) temporarily filling a fluid into the plurality of the cells of the formed film;
    d) closing the plurality of cells of the formed film; and
    e) bonding an upper-side film onto the plurality of the cells,
    wherein in the step d), the plurality of cells are temporarily closed when the plurality of cells passes through an apron conveyor in a state in which the fluid is temporarily filled in the plurality of cells, the apron conveyor compressing one side or another side of the respective cell or compressing both of the one side and the another side of the respective cell, and
    wherein the apron conveyor compresses the one side or the another side of a respective cell inwardly of the respective cell or compressing both of the one side and the another side of the respective cell inwardly of the respective cell.

2. The method of claim 1, further comprising:
    f) leaking the fluid from the closed plurality of cells; and
    g) winding the formed film, the lower-side film, and the upper-side film on an outer surface of a winding roller.

3. The method of claim 1, wherein the formed film in the step a) is manufactured in that a thermoplastic synthetic resin is melt-extruded to an embossing roller in which forming grooves having a shape corresponding to the cells are formed on an outer circumferential surface thereof at a regular interval, and
    in the step b), the lower-side film is bonded to the formed film by a lower-side film compression roller which compresses the lower-side film unwound from a lower-side film roller onto the embossing roller.

4. The method of claim 1, wherein the formed film in the step a) is manufactured by an embossing roller in which forming grooves having a shape corresponding to the cells are formed on an outer circumferential surface thereof at a regular interval, and
    in the step b), the lower-side film is bonded to the formed film by: applying an adhesive to the lower-side film unwound from a lower-side film roller at a predetermined interval; and compressing the lower-side film unwound from the lower-side film roller onto the embossing roller.

5. The method of claim 1, wherein the fluid is temporarily filled in the plurality of cells by a fluid injector injecting the fluid into the plurality of cells.

6. The method of claim 1, wherein in the step e), the upper-side film is bonded onto the plurality of cells by an upper-side film compression roller which compresses a melt-extruded thermoplastic synthetic resin for manufacturing the upper-side film onto the plurality of cells.

7. The method of claim 1, wherein in the step e), the upper-side film is bonded onto the plurality of cells by: applying an adhesive to the upper-side film unwound from an upper-side film roller at a predetermined interval; and compressing the upper-side film unwound from the upper-side film roller onto the plurality of cells.

* * * * *